Figure 1:
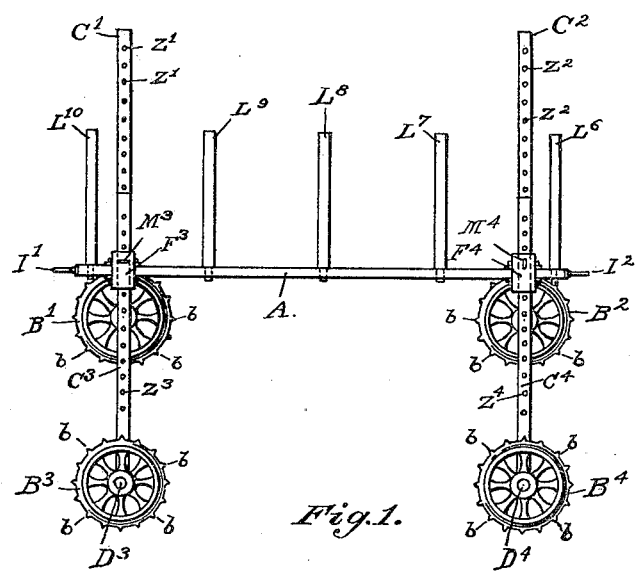

No. 696,535. Patented Apr. 1, 1902.
M. E. BAILEY.
ADJUSTABLE TRUCK.
(Application filed Sept. 3, 1901.)
(No Model.)

Witnesses:
S. C. Duvall.
R. E. Randle.

Inventor:
M. E. BAILEY,
by his attorney,
Robert W. Randle.

UNITED STATES PATENT OFFICE.

MOSES E. BAILEY, OF NEAR FOUNTAIN CITY, INDIANA.

ADJUSTABLE TRUCK.

SPECIFICATION forming part of Letters Patent No. 696,535, dated April 1, 1902.

Application filed September 3, 1901. Serial No. 74,200. (No model.)

*To all whom it may concern:*

Be it known that I, MOSES E. BAILEY, a citizen of the United States, residing near Fountain City, in the county of Wayne and State of Indiana, have invented new and useful Improvements in Adjustable Trucks, of which the following is a specification, which is sufficiently clear and concise as to enable others skilled in the art to which it appertains to make and use the same.

My invention consists in the parts, arrangement, improvements, shape, and combinations thereof, substantially as hereinafter shown and described, and specifically set forth in the appended claims terminating this specification.

The most important object of my invention is to provide an adjustable truck especially intended to travel over the surface of a roof of any slope and means for retaining my truck in contact therewith and for supporting the deck of my truck level for the purpose of carrying a load on the upper surface thereof.

Another object of my invention is to provide a truck which can be easily and quickly adjusted so that the deck thereof may be carried level while the truck is at rest or while it is being made to travel over a roof or other surface at any angle.

Another object is to provide a truck especially designed to travel over the surface of sloping roofs for the purpose of carrying shingles or other material on its deck, means for retaining the truck in contact with the roof, and means for adjusting the truck to the slope of the roof; and still another object is to provide a new article of manufacture in an adjustable truck which will be neat and attractive in appearance, easily operated, capable of a wide range of usefulness, and which can be manufactured and sold at a comparatively low price.

Other objects and advantages will appear from the following specification and from the drawings forming a part thereof, as fully set forth hereinafter.

The distinctive features of my invention herein shown and described, briefly stated, consist, first, of a parallelogram-shaped deck; second, standards rising from the sides of the deck; third, castings provided with perpendicular slots secured near each corner of the deck; fourth, perforated arms adapted to slide through said slots and held perpendicular thereby; fifth, axles provided on the lower end of said perpendicular arms and at right angles thereto; sixth, wheels provided for each of said axles; seventh, said wheels being provided on their periphery with spickets; eighth, means for adjusting perpendicularly the said arms in their respective castings, and, ninth, handles provided at each end of the deck for moving the truck.

The details of the invention and the manner of operation will now be fully set forth, and the novel features will be recited in the appended claims.

Figure 2:
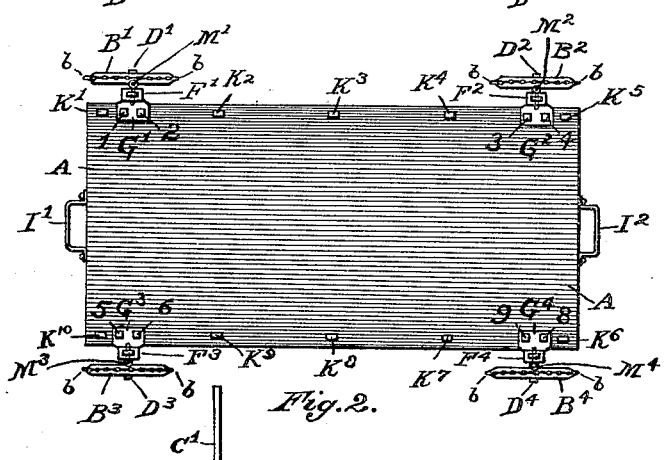
Figure 3:
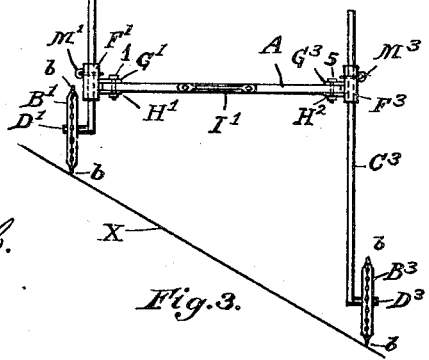

In the accompanying drawings, Figure 1 is a side elevation of my truck, showing the adjustment of the wheels for operation on a sloping roof. Fig. 2 is a plan view of the same; and Fig. 3 is an end elevation of the same, in which X represents the slope of the surface of a roof.

Similar letters and figures of reference denote and refer to like parts throughout the several views.

Referring now to the drawings, A represents the body or deck of my truck, which can be made of metal, wood, or other material, which I prefer to have made of substantially the proportions shown in the drawings. Near the edges of the two sides of A, I provide holes or mortises, as shown by $K'$, $K^2$, $K^3$, $K^4$, $K^5$, $K^6$, $K^7$, $K^8$, $K^9$, and $K^{10}$, in which standards may be inserted, as shown by $L^6$, $L^7$, $L^8$, $L^9$, and $L^{10}$ in Fig. 1. Said standards may be inserted loosely or their lower ends may be rounded and threaded and provided with nuts, if preferred. At each end of the deck A and secured to the edges thereof I secure thereto by bolts or screws the handbolts $I'$ and $I^2$, as shown in the drawings.

$B'$ represents one of the wheels, which is provided on its periphery with a number of spickets $b$, as shown.

$C'$ represents a perpendicular arm which is provided with holes $Z'$ therethrough, placed at frequent intervals along its entire length, as shown in the drawings, $C'$ being of a size to snugly fit in the slot in $F'$ and adapted to slide up and down therein. In the upper portion of $F'$, I provide a hole of same size as the holes $Z'$, which is adapted to be brought into alinement therewith, adapted to be loosely inserted in said hole in F', and at the same time to pass through one of the holes Z'. I provide a pin or bolt M' for the purpose of locking C' at any point desired.

D' represents the axle on which the wheel B' is journaled, said axle being formed on the lower end of C' and extending out at right angles therefrom. The wheel B' is held in place on the axle D' in any well-known manner.

F' represents a member which, together with the two wings G' and H', I term a "casting," the part F' lying perpendicular and is provided with a slot which extends perpendicularly through its entire length, said slot being of a size to allow the arm C' to pass through it.

G' and H' represent two wings or plates, which are integral parts of F', which extend inward from F' and are opposite to each other perpendicularly, and the distance between them corresponds to the thickness of the deck A.

Two or more holes are made through the wings G' and H' and corresponding holes through the edge of the deck A, through which bolts 1 and 2 are inserted to hold the casting securely in contact with the deck A, as shown.

I have just described the parts located near the upper left-hand corner of my truck, which parts are represented by letters B, C, D, F, G, H, M, and Z, with auxiliary figures "1" in connection with each of said letters. Near the upper right-hand corner of A corresponding parts are located, which are indicated by the same reference-letters as above, with auxiliary figures "2" in connection with each. Near the lower left-hand corner of A corresponding parts are located and indicated by the same reference-letters as above, with auxiliary figures "3" in connection with each, and near the lower right-hand corner of A corresponding parts are located, indicated by same reference-letters as above, with auxiliary figures "4" in connection with each. The figures when in connection with the reference-letters simply denote the location of that particular part.

Each of the four wheels is provided with a number of spickets $b$, extending out from the periphery thereof. Said spickets $b$ may be made with the wheel and can be an integral part thereof, or they may be made separate and inserted tightly in holes provided in the periphery of the wheel for that purpose.

The independent reference-figures 1 2, 3 4, 5 6, and 8 9 represent bolts which pass through holes in the upper and lower wings of the castings and through corresponding holes in the edge of the deck. By means of said bolts the castings are securely connected to the deck, as shown.

With the arrangement of the various parts as herein shown and described it is apparent that either side of my truck can be raised or lowered and secured in the position desired for the purpose of retaining the deck of my truck level while the truck is moved back and forth along a roof of any slope. The spickets $b$ enter lightly into the roof and prevent the wheels from slipping, which they would do were the spickets not provided. It can now be seen that the deck of my truck can be loaded with shingles or the like, and my truck can be moved over the roof, so as to keep a supply of material within reach of the operator, thus dispensing with the necessity of scattering the shingles over various parts of the roof, where they at times are in the way of the operator and are frequently blown about by the wind.

My invention is perfectly adapted to accomplish the results for which it is intended, and it is evident that changes in and modifications of the specific construction herein shown and described may be made and that analogous parts may be used to accomplish the same results without departing from the spirit of my invention or sacrificing any of its many advantages, and the specific construction of the details of my truck, in which novel features are embodied, may be variously changed without altering the essential principles which are claimed as new.

The terms "upward," "downward," "front," "rear," and other similar terms are used for convenience of description, and it is not intended by their use to limit the arrangement of the parts to the relative position indicated.

I wish it to be distinctly understood that I do not dedicate any part of my invention to the public and that I wish adequate and just protection for every feature of the invention and the various parts herein shown and described that is new and useful and which involves invention.

Having now fully shown and described my invention and the best mode for its construction to me known at this time, what I claim as new, and desire to secure by Letters Patent of the United States, is—

1. In an adjustable truck, the combination of a deck with holes along the edges of its longer sides, handholts secured at either end of the deck, castings secured near each of the corners of the deck, perpendicular slots near the outer edges of the castings, arms adapted to move up and down in said slots, means for holding the arms in said slots at any point by means of pins to be inserted in holes extending through the arms and through the upper part of the castings, axles provided on the lower ends of each of the arms and at right angles thereto, and wheels provided with spickets on their peripheries, adapted to revolve on said axles, all substantially as shown and described and for the purposes set forth.

2. In an adjustable truck, a deck provided with standards loosely inserted in holes in the edges thereof, in combination with castings secured to the corners of the deck, perpendicular slots provided in the outer edges of the castings, arms adapted to slide up and down in said slots and adapted to be secured at any point desired, axles which extend out at right angles from the lower ends of said arms, wheels mounted on said axles, a multiple of spickets extending outward from the periphery of each wheel, all substantially as shown and described and for the purposes specified.

In testimony whereof I have hereunto set my hand, in the presence of two subscribing witnesses, this the 31st day of August, 1901.

MOSES E. BAILEY.

Witnesses:
R. W. RANDLE,
R. E. RANDLE.